United States Patent

Herbig

[11] Patent Number: 5,991,342
[45] Date of Patent: Nov. 23, 1999

[54] FREQUENCY ERROR DETECTOR

[75] Inventor: Peter Herbig, Oppenweiler, Germany

[73] Assignee: Robert Bosch GmbH, Stuttgart, Germany

[21] Appl. No.: 08/930,661

[22] PCT Filed: Sep. 26, 1996

[86] PCT No.: PCT/DE96/01873

§ 371 Date: Oct. 6, 1997

§ 102(e) Date: Oct. 6, 1997

[87] PCT Pub. No.: WO97/30536

PCT Pub. Date: Aug. 21, 1997

[30] Foreign Application Priority Data

Feb. 16, 1996 [DE] Germany .................... 196 05 704

[51] Int. Cl.$^6$ .................................................. H04L 27/14
[52] U.S. Cl. ..................... 375/326; 329/306; 329/124; 455/226.1; 375/344
[58] Field of Search ........................... 329/308, 309, 329/304, 306, 307; 331/12; 375/326, 344; 455/226.1

[56] References Cited

U.S. PATENT DOCUMENTS

| | | | |
|---|---|---|---|
| 4,470,145 | 9/1984 | Williams | 375/200 |
| 4,721,924 | 1/1988 | Masdea et al. | 331/1 A |
| 5,014,352 | 5/1991 | Chung | 455/314 |

*Primary Examiner*—Amanda T. Le
*Assistant Examiner*—Dac V. Ha
*Attorney, Agent, or Firm*—Kenyon & Kenyon

[57] ABSTRACT

A frequency error detector which is independent of channel distortion and determines in a receiver the frequency deviation between the carrier frequency generated in the receiver and the carrier frequency of a received signal has a first differential power meter that forms the power difference between spectral components that are symmetrical with the receiver carrier frequency and belong to the received signal spectrum, and it has a second differential power meter that forms the power difference between spectral components that are symmetrical with the receiver carrier frequency and belong to the spectrum formed by undersampling of the received signal. The sum of the output signals of the two differential power meters provides information on the frequency deviation.

3 Claims, 2 Drawing Sheets

FREQUENCY ERROR DETECTOR

FIELD OF THE INVENTION

The present invention relates to a frequency error detector that determines the frequency deviation between a carrier frequency generated in a receiver and the carrier frequency of a received signal, with a first differential power meter that forms the power difference between spectral components of the spectrum of the received signal that are symmetrical with the receiver carrier frequency.

BACKGROUND INFORMATION

Frequency error detectors are used for automatic frequency control (AFC) in control loops that are in radio transmission receivers, for example, for coherently modulated signals (e.g., quad amplitude modulation, QAM) to adjust the carrier frequency of the receiver to the carrier frequency of the transmitter, i.e., the carrier frequency of the received signal. In addition, these receivers for coherently modulated signals often have another closed loop for carrier phase synchronization which is capable of synchronization in the case of relatively small frequency deviations. The frequency error allowed in synchronization of the carrier phase is called the lock-in range. Since the transmission carrier frequency is not known at the start of a transmission or after a system failure, the receiver must be capable of reliably estimating this frequency. The accuracy of this estimation must be within the lock-in range of the carrier phase synchronization. The size of this lock-in range depends on several system parameters of the broadcast system. Narrow-band broadcast systems with a high number of modulation levels have a smaller lock-in range, but broad-band systems with fewer modulation levels have a larger lock-in range.

A conventional frequency error detector includes a suitable device that synchronizes the carrier frequency of the receiver at the transmission carrier frequency. This conventional device measures the differential power of the received signal spectrum symmetrically with the center of the band. An error signal generated in this way will disappear at the correct carrier frequency in the receiver. A quadricorrelator as descrived in German Patent No. 37 07 762 is one such frequency error detector. This quadricorrelator reacts very sensitively to signal distortions; i.e., it supplies false information about the frequency deviation when the received signal spectrum is skewed because of channel distortion. Straight-line broadcast systems usually have great channel distortion. Therefore, the background art frequency error detector would not be suitable for a receiver in a transmission system where channel distortion is expected.

The object of the present invention is therefore to provide a frequency error detector that will supply the most accurate possible information about the deviation in the carrier frequency in the receiver in comparison with the transmitted carrier frequency regardless of channel distortions.

SUMMARY OF THE INVENTION

According to the present invention, in addition to a first differential power meter, a second differential power meter is provided to form the power difference between spectral components that are symmetrical with the received carrier frequency and belong to the spectrum formed by undersampling of the received signal, and a summation circuit is provided that generates, from the output signals of the two differential power meters, a summation signal that provides information on the frequency deviation.

DETAILED DESCRIPTION OF THE DRAWINGS

Figure 1:
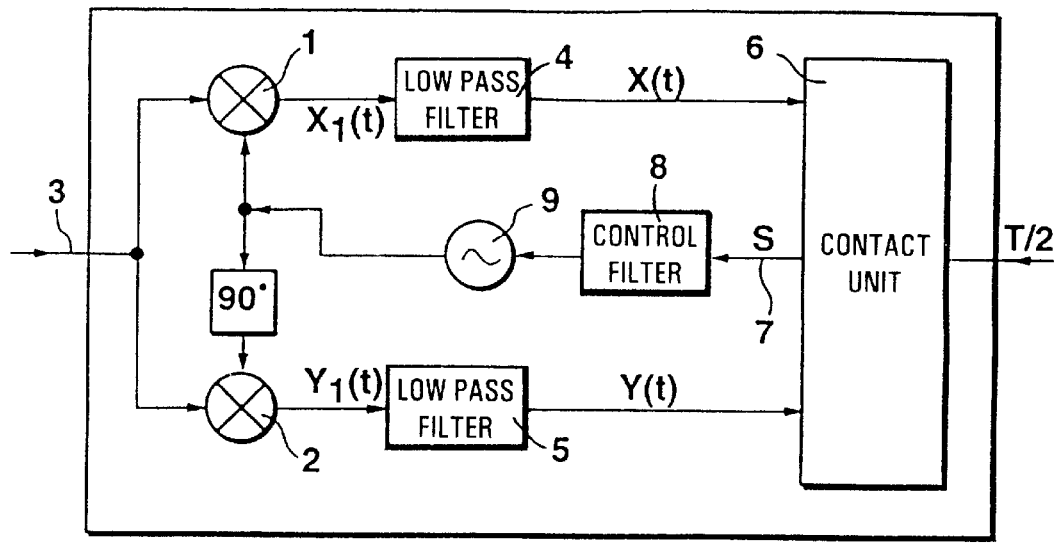
FIG. 1 shows a block schematic of a receiver according to the present invention.

FIG. 1 shows a receiver designed as, e.g., a phase-locking loop for coherently modulated signals, e.g., QAM signals. This phase-locking loop has two mixers 1 and 2 that convert the signal they receive over input line 3 into two baseband signals X1(t) and Y1(t). Low-pass filters 4 and 5 suppress unwanted signal components in the two baseband signals X1(t) and Y1(t) and thus generate two signals X(t) and Y(t). Both signals X(t) and Y(t) are sent to a contact unit 6 with a frequency error detector that analyzes signals X(t) and Y(t) in a manner to be described in greater detail below and derives there from a frequency correction signal S that is delivered to a control filter 8 over output line 7. This control filter 8 has the function of smoothing the frequency correction signal S and routing the signals to a controllable oscillator 9 that generates a carrier signal for mixers 1 and 2, with the carrier signal for mixer 2 being phase rotated by 90°. Frequency error detector needs a sampling pulse that corresponds to the half symbol pulse T/2 of the received signal for sampling signal components X(t) and Y(t), which is phase shifted by 90°. Signal components X(t) and Y(t) reproduce the respective received signal value exactly only when the carrier generated by oscillator 9 is frequency-synchronized with the carrier of the received signal.

Figure 3C:
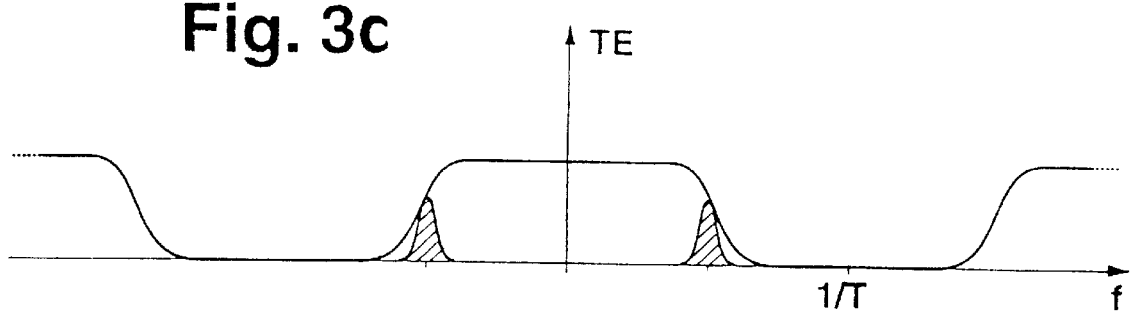
FIG. 3c shows a third example of the signal spectra emitted by the first differential power meter.
Figure 4C:
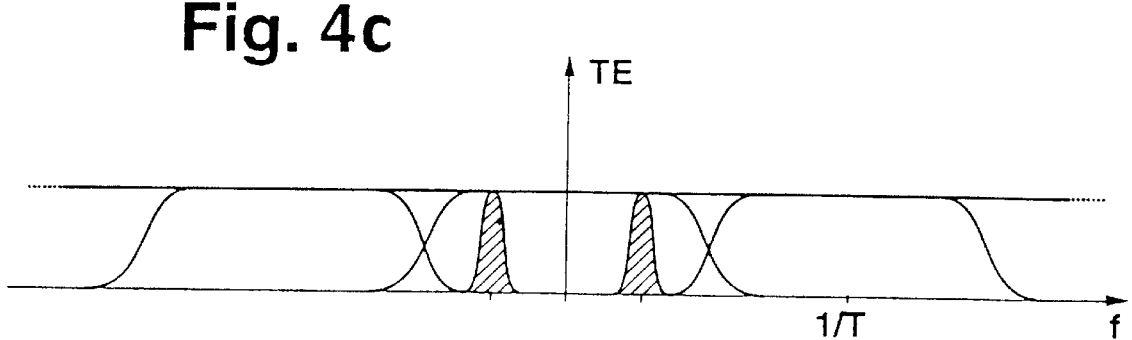
FIG. 4c shows a third example of the signal spectra emitted by the second differential power meter.

The frequency error detector should provide information on the frequency deviation between the carrier frequency of oscillator 9 and the carrier frequency of the received signal as independently of any channel distortion as possible. This requirement is met by a frequency error detector consisting of two differential power meters, e.g., quadricorrelators. A differential power meter forms the power difference between spectral components of the received signal spectrum that are symmetrical with the receiver carrier frequency. The first differential power meter receives a received signal spectrum that is generated by sampling twice per symbol pulse of the received signal (maintaining the Nyquist criterion). FIG. 3C shows such a spectrum, which is repeated periodically without overlap. The spectrum shown in FIG. 3c is preferably symmetrical with the receiver carrier frequency TE; i.e., there is no frequency deviation between the receiver carrier frequency TE and the carrier frequency of the received signal. The pass bands (shaded areas) of two band-pass filters of the differential power meter are also symmetrical with the receiver carrier frequency TE in proximity to the Nyquist edges of the received signal spectrum. The spectral components selected by the two band-pass filters are equal in size in this case, so the difference between the powers of these spectral components yields a value of zero. The second differential power meter processes a spectrum (shown folded over in FIG. 4c) which is formed by undersampling (failure to uphold the Nyquist criterion). These mutually overlapping spectra are obtained when the received signal is sampled only once per symbol pulse T. The pass bands of the band-pass filters of this second differential power meter are now closer to the carrier frequency TF of the received signal, i.e., at a greater distance from the Nyquist edges of the spectrum.

As shown in FIGS. 3a, 3b and 4a, 4b, the output signal of the first differential power meter is dependent on both a frequency shift and a channel distortion, and the output signal of the second differential power meter shows almost no dependence on a frequency deviation, but instead is dependent only on skewing of the spectrum caused by channel distortion. The second differential power meter could therefore also be called a distortion detector.

Figure 3A:
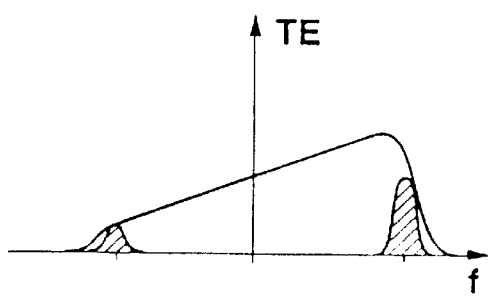
FIG. 3a shows a first example of a signal spectra emitted by a first differential power meter.
Figure 3B:
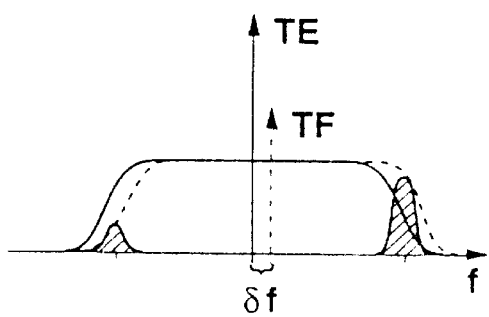
FIG. 3b shows a second example of the signal spectra emitted by the first differential power meter.
Figure 4B:
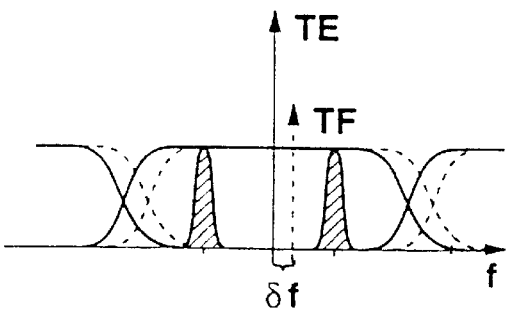
FIG. 4b shows a second example of the signal spectra emitted by the second differential power meter.

FIG. 3a shows a spectrum processed by the first differential power meter, which does not have any frequency shift but is skewed because of channel distortion. This illustration shows the selected spectral components that are symmetrical with the receiver carrier frequency TE have different powers because of the skewing. The output signal of the first differential power meter is thus dependent on a channel distortion. In addition, it is also dependent on a shift δf between the receiver carrier frequency TE and the received signal carrier frequency TF, as illustrated in FIG. 3b. The solid line indicates a spectrum without frequency shift and the dashed line indicates a spectrum with the frequency shift δf. The spectral components selected by the first differential power meter at the Nyquist edges of the spectrum shifted by δf have different powers, depending on the frequency shift δf. Thus, the output signal of this first differential power meter contains information about the frequency shift δf.

Figure 4A:
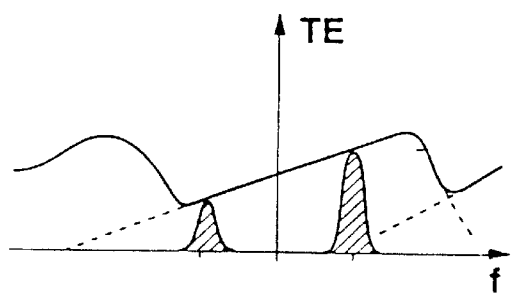
FIG. 4a shows a first example of the signal spectra emitted by a second differential power meter.

FIG. 4a shows a folded spectrum that has skewing caused by channel distortion and is processed by the second differential power meter. The spectral components selected to be symmetrical with the receiver carrier frequency TE have different powers, the output signal of the second differential power meter is also dependent upon the channel distortion. However, if there is a frequency shift δf between the receiver carrier frequency TE and carrier frequency TF of the received signal, then the spectral components selected from the shifted spectrum (dashed line) have the same power levels. The power difference of the selected spectral components is therefore zero, although there is a frequency shift δf. The output signal of the second differential power meter thus shows a dependence only on channel distortion. The output signal of the second differential power meter which depends only on channel distortion can thus be used to compensate for the dependence of the output signal of the first differential power meter on channel distortion, so that ultimately a signal derived from the superposition of the two output signals depends only on the frequency deviation between the receiver carrier frequency TE and the received signal carrier frequency TF. Such an error correction signal S shown in (FIG. 1) would synchronize oscillator 9 at the correct carrier frequency, regardless of channel distortion.

Figure 2:
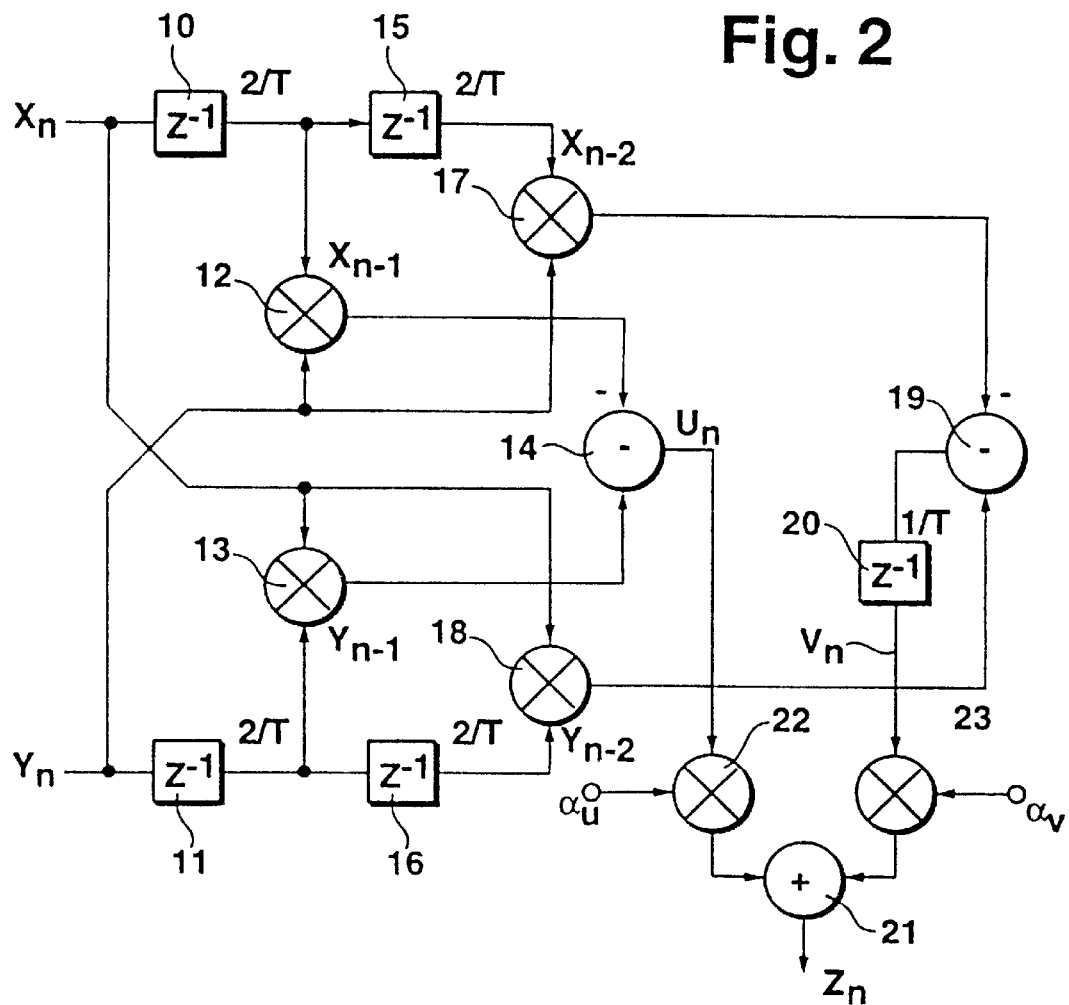
FIG. 2 shows a frequency error detector used in the receiver according to the present invention.

FIG. 2 shows an embodiment of a circuit according to the present invention where the two differential power meters are combined. In this embodiment, the differential power meters each have the structure of a quadricorrelator, which is describibeding German Patent No. 37 07 762, for example. The discrete-time signals $x_n$ and $y_n$ derived by sampling the in-phase signal component X(t) and the quad signal component Y(t) of the received signal are applied to two inputs of the frequency error detector. From these discrete-time signals $x_n$ and $y_n$, a first quadricorrelator derives, according to equation (1), a signal $u_n$ having a dependence on both frequency shift and channel distortion:

$$u_n = y_n x_{n-1} - x_n y_{n-1} \tag{1}$$

Subscripts n and n-1 indicate the sampling times in the half sampling pulse T/2. This equation (1) is implemented according to FIG. 2 using two time-delay elements 10 and 11, which delay the discrete-time input signals $x_n$ and $y_n$ by one sampling pulse, and a first multiplier 12, which generates product $y_n x_{n-1}$, and a second multiplier 13, which forms product $x_n y_{n-1}$. A subtracter 14 forms the difference of the output signals of the two multipliers 12 an 13 and finally supplies signal $u_n$.

Output signal $v_n$ of the second differential power meter for the folded received signal spectrum results from the relation of the discrete-time received signal values $x_n$, $x_{n-2}$ and $y_n$, $y_{n-2}$ according to equation (2):

$$v_n = \begin{cases} y_n x_{n-2} - x_n y_{n-2} & n \text{ even} \\ 0 & n \text{ odd} \end{cases} \tag{2}$$

Received signal values $x_{n-2}$ and $y_{n-2}$ at time n-2 are obtained by additional time-delay elements 15 and 16, which are connected in series with the first time-delay elements 10 and 11. A multiplier 17 generates the product of received signal values $y_n x_{n-2}$, and a multiplier 18 generates the product of received signal values $x_n y_{n-2}$. The difference between the two products according to equation (2) is generated by a subtracter 19. Time-delay element 20, which is connected to the output of subtracter 19, works with symbol pulse 1/T, so it selects only every second value out of the differential signal. This undersampling yields the folded spectrum shown in FIGS. 4a, 4b, and 4c as described above. Output signal $v_n$ of time-delay element 20 shows the desired dependence exclusively on channel distortion. By combining signal $v_n$, which depends only on channel distortion, and signal $u_n$, which depends on both frequency deviation and channel distortion, a signal is obtained in which the effects of channel distortion are mutually compensated and which ultimately depends only on the frequency deviation between the receiver carrier and the received signal carrier. To optimize compensation of channel distortion, it is expedient to weight the two signals $u_n$ and $v_n$ over multipliers 22 and 23 with suitable weighting factors $\alpha_u$ and $\alpha_v$. Finally, a summation unit 21 superimposes the weighted output signals $u_n$ and $v_n$ of the two differential power meters on signal $z_n$ which is given in equation (3) and provides the desired information about the frequency deviation regardless of channel distortion:

$$z_n = \alpha_u u_n + \alpha_v v_n \tag{3}$$

What is claimed is:

1. A frequency error detector for determining a frequency deviation between a first carrier frequency generated in a receiver and a second carrier frequency of a received signal, the received signal having a first spectrum, the frequency error detector comprising:

a first differential power meter determining a first power difference between first spectral components of the first spectrum and generating a first output signal, the first spectral components being symmetrical with the first carrier frequency;

a second differential power meter determining a second power difference between second spectral components of a second spectrum formed by undersampling of the received signal and generating a second output signal, the second spectral components being symmetrical with the first carrier frequency; and a summation circuit generating a summation signal as a function of the first and second output signals to provide data relating to the frequency deviation.

2. The frequency error detector according to claim 1, wherein the first and second differential power meters include quadricorrelators.

3. The frequency error detector according to claim 1, wherein the first differential power meter analyzes the first spectrum formed by sampling the received signal twice per symbol pulse, and wherein the second differential power meter analyzes the second spectrum formed by sampling the received signal once per symbol pulse.

* * * * *